(12) United States Patent
Nathan et al.

(10) Patent No.: US 9,921,971 B2
(45) Date of Patent: Mar. 20, 2018

(54) CONTEXT BASED CACHE EVICTION

(71) Applicants: Eyal Nathan, Modiin (IL); Oleg Kossoy, Netanya (IL); David Malachi, Tel Aviv (IL)

(72) Inventors: Eyal Nathan, Modiin (IL); Oleg Kossoy, Netanya (IL); David Malachi, Tel Aviv (IL)

(73) Assignee: SAP PORTAL ISRAEL LTD., Ra'Anana (IL)

( * ) Notice: Subject to any disclaimer, the term of this patent is extended or adjusted under 35 U.S.C. 154(b) by 252 days.

(21) Appl. No.: 14/316,042

(22) Filed: Jun. 26, 2014

(65) Prior Publication Data

US 2015/0378934 A1     Dec. 31, 2015

(51) Int. Cl.
*G06F 12/12*     (2016.01)
*G06F 12/121*    (2016.01)

(52) U.S. Cl.
CPC .... *G06F 12/121* (2013.01); *G06F 2212/1044* (2013.01)

(58) Field of Classification Search
CPC .................................................... G06F 12/121
See application file for complete search history.

(56) References Cited

U.S. PATENT DOCUMENTS

| 6,823,514 | B1 * | 11/2004 | Degenaro | G06F 12/0842 711/200 |
| 2009/0089259 | A1 * | 4/2009 | Musumeci | G06F 9/383 |
| 2012/0215985 | A1 * | 8/2012 | Hunt | G06F 12/122 711/133 |

\* cited by examiner

*Primary Examiner* — Reginald G Bragdon
*Assistant Examiner* — Edward Wang
(74) *Attorney, Agent, or Firm* — Buckley, Maschoff & Talwalkar LLC (57) ABSTRACT

A method, medium, and system to receive a request to add a resource to a cache, the resource including a data object and a context item key associated with the resource and uniquely identifying a context of use referenced by the context item key; determine whether the resource is stored in the cache; store, in response to the determination that the resource is not stored in the cache, the resource in the cache; and add the context item key of the resource stored in the cache to a record of reference list of resources.

22 Claims, 5 Drawing Sheets

| OBJECT | OBJECT KEY | CONTEXT ITEM KEY |
|---|---|---|
| Profile of John Doe  220 | JDoe123  225 | mtg_001; mtg_003 |
| Profile of Sue Smith  240 | SSmith456  245 | mtg_002 |
| Avatar of R. Jones  255 | RJones098  260 | mtg_001 |

205 → OBJECT; 210 → OBJECT KEY; 215 → CONTEXT ITEM KEY; 235; 250; 230

CONTEXT BASED CACHE EVICTION

BACKGROUND

Cache replacement policies or cache policies may be used by a computing system or device to manage a cache memory for data stored therein. In some instances, the cache policy is invoked when the cache is full and one or more data items need to be removed from the cache to make room for new data items. The cache policy and a controller governing implementation of the cache policy may operate to determine which data items or resources are evicted from the cache to make room for the new data items.

Commonly used eviction policies are based on a data resource's age and usage (e.g., a "Least Recently Used" (LRU) cache eviction policy). However, such policies do not consider or take into account the relevance of the resource to the system user/s. Accordingly, a LRU cache policy may lead to the eviction of resources that are still needed by users even though they may be accessed less recently than other data resources. Eviction of such resources may lead to increased response times for users, and negatively affect an overall system, application, or device performance.

DETAILED DESCRIPTION

Figure 1:
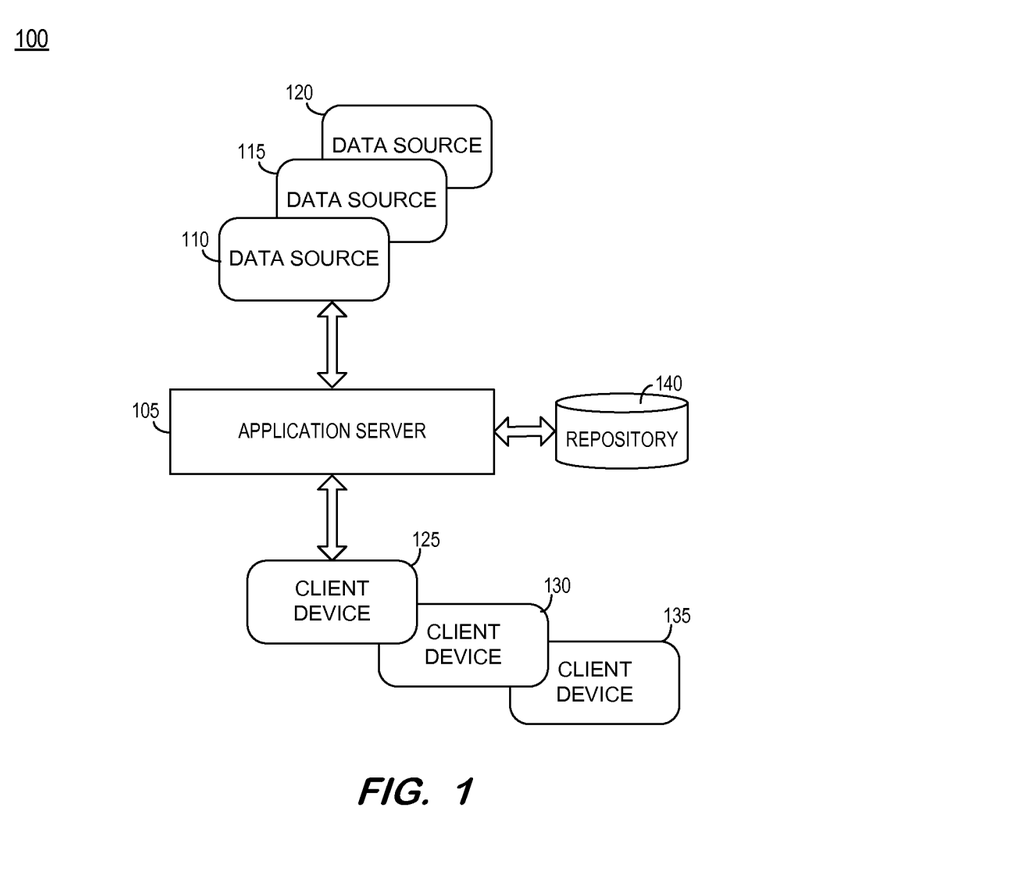
FIG. 1 is a block diagram of a system, according to some embodiments.

FIG. 1 is a block diagram of a system 100, according to some embodiments herein. System 100 represents a logical architecture for describing processes and a framework for a cache manager that provides a mechanism to evict data items from a cache based on a relevance or context of use associated with the data items. Actual implementations of system 100 may include more or different components arranged in other manners than that shown in FIG. 1.

System 100 includes an application server 105 to provide resources from data sources 110, 115, and 120 to client devices 125, 130, and 135. Data sources 110, 115, and 120 may be located remotely from application server 105 and/or client devices 125, 130, and 135. In some instances, application server 105 may receive a request to provide a resource from data source 110 to client device 125. Application server 105 may operate to retrieve the requested resource from data source 110 and transmit the requested resource to client device 125. In some aspects, application server 105 may store the resource in repository 140. Unless otherwise stated, the resources herein may be of any data type and data structure including, but not limited to, a text file, an image file, an audio file, a structured data file, a video, a file containing unstructured data, a multimedia file, a hypertext markup language file, a message, a notification, a database item or object, combinations thereof, and other data structures without limit.

In some embodiments, one or more of client devices 125, 130, and 135 may be mobile computing device such as smart phone that includes a telephone functionality and an ability to execute applications stored thereon. The client devices may be embodied as other devices and systems other than a smartphone. In some instances, an application such as an email client, calendar application, a social media application, business application, or a browser running on the client device may initiate a request for a resource from application server 105.

In an effort to improve performance (e.g., responsiveness) associated with retrieving and storing resources loaded from remote locations, requested resources may be stored locally in a cache of the client devices making the requests for the resources. In some instances, including but not limited to scenarios where the client devices are smart phones, client devices 125, 130, and 135 may have a relatively limited amount of cache available for storing the resources. In some aspects, the size of the cache may vary from one client device to a next client device. Given the limited amount of cache and/or the unpredictability of cache that may be available in a client device, performance of an application running on the client devices 125, 130, and 135 may be less than optimal. For example, operating performance of a particular application on a client device with limited cache may be slow since the client device may not be able to efficiently store items in cache where they may be quickly accessed in a manner that is relevant to the use of the resources by the subject application.

In some instances, application server 105 may store the requested resources in its cache (not shown) for a future use in an effort to improve performance by having the resources available in cache for fast retrieval, as opposed to fetching the resources from remote data sources 110, 115, and 120 or a disk based storage location (e.g., repository 140) each time the resource is requested. Although application server may have a relatively large cache as compared to clients 125, 130, and 135, the application server's cache may be quickly filled based on, for example, the number of clients it services and the number of resource requests those plurality of clients invoke.

In some aspects, a resource may include a data object (e.g., an image file, a document, an email message, etc.) and an object key. The object key is a unique identifier for the data object. In some instances, the object key may be generated by an application, a database, or a memory mechanism. In some embodiments herein, a context item key may be associated with the resource. The context item key may be a unique identifier of a context of use that is referenced by the context item key.

In some embodiments, the context of use referenced by a context item key may vary depending on a particular application, use-case, and type of resource with which the context item key is associated. For example, regarding a communication application concerned with email communications and meetings for a user, a context item key may be associated with each email message and each meeting relating to the user. Since the context item key is a unique identifier of the context of use that is referenced by the context item key, each email meeting and meeting is uniquely identified by its referencing context item key.

Figure 2:
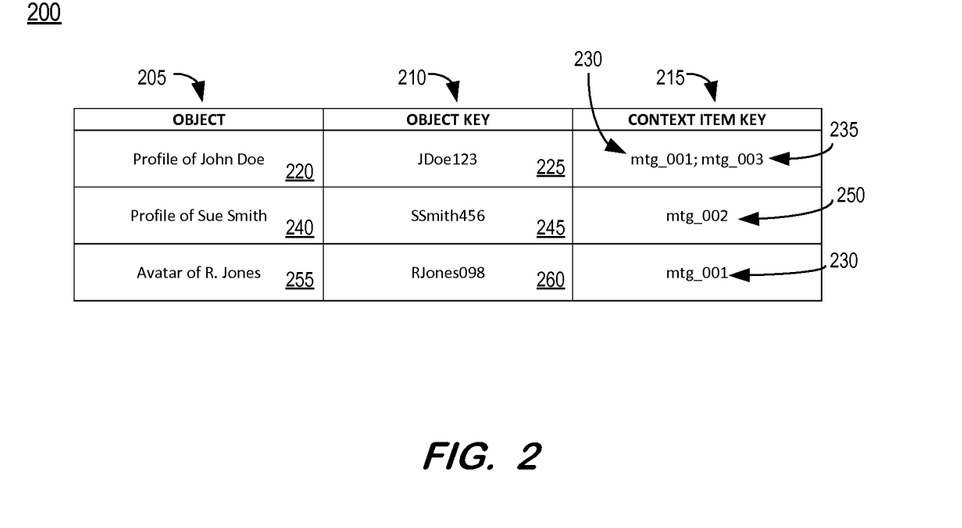
FIG. 2 is an illustrative depiction of a reference list of references, according to some embodiments.

FIG. 2 is an illustrative example of a reference list of resources 200. As used herein, a reference list of resources may be implemented by an instance of a data structure such as, for example, a file, a record, a database object, a database table, etc. Reference list of resources 200 is a logical representation of a reference list and an actual implementation of the reference list of resources may include more or different aspects, configurations, features, etc. than those depicted in FIG. 2. Regarding FIG. 2, the reference list of resources 200 includes a field 205 for a data object, a field for an object key that uniquely identifies the data object at 210, and a context item key field 215 that is a unique identifier of a context of use that is referenced by the context item key and associated with the data object 205. For example, a resource may include data object 220 that is a profile (e.g., biographical summary) of John Doe includes an object key 225 that uniquely identifies that data object based on some convention. The resource of data object 220 further includes a context item key 230 (mtg_001) that is a unique identifier of a context of use referenced by the context item key. In this instance, the context of use for context item key 230 is a first meeting. The user "John Doe" is associated with the first meeting (mtg_001) because a communication application including implementations of some embodiments herein is aware of an upcoming meeting the user is scheduled to attend. It is noted that the user "John Doe" (data object 220) is also associated with another context item key 235 (meeting "mtg_003"). Likewise, the data object 240 of a profile of user "Sue Smith" is associated with an object key 245 and a context item key 250 (meeting "mtg_002"); and the data object 255 of an avatar of user "R. Jones" is associated with an object key 260 and the first context item key 230 (meeting "mtg_001").

In some embodiments, the profiles, avatars, and other data objects and items associated with different people may be requested and retrieved from one or more data sources in connection with using a communication application to schedule a meeting with those people by the application. The requested the profiles, avatars, and other data items or resources may be stored in a cache. In some aspects, the communication application may be executing on a client device (e.g., smartphone 130) or a server (e.g., application server 105). In some embodiments, portions of the application may be operating on both the client device and the server. Accordingly, the requested data resources such as, for example, the profiles, avatars, and other data items may be stored in a cache of the client device or the server, as appropriate per the application.

In some aspects, the application may determine that a meeting is relevant until an end time of the meeting. When the meeting is no longer relevant, the application may notify a cache manager or controller implementing a context-aware cache eviction policy or mechanism herein. In response to the notification, the cache manager or controller implementing a context based cache eviction policy or mechanism herein may proceed to evict data items no longer deemed relevant from the cache. In this manner, the cache may be efficiently used for storing data that is relevant to its use. In some embodiments, an application, service, device, or system implementing the processes disclosed herein may determine a relevance associated with a context item key.

Referring to FIG. 2, a context item key may be removed from reference list of resources 200 when the context of use (e.g., meeting mtg_001) referenced by the context item key is no longer relevant. For example, context item key 230 may be deleted after the first meeting (mtg_001) has occurred or ended. Once ended, the meeting is no longer relevant, according the communication application of the present example. According to some embodiments, data object 255 may then be deleted from the reference list of resources once all of its associated context item key(s) are deleted. An absence of context item keys associated with a data object may indicate that the data object is not relevant. Accordingly, the data object having no associated context item keys may be evicted (deleted) from the cache. Continuing the present example, after the first meeting (mtg_001), referenced by context item key 230, occurs and context item key is removed from the reference list of resources, data object 255 may be deleted from cache since it has no other context item keys associated with it. However, data object 220 (i.e., the "Profile of John Doe") is not deleted after the occurrence of the first meeting and the removal of the context item key 230 from the reference list of resources because context item key 235 is still associated with data object 220.

In some embodiments, the present disclosure may provide and define a framework for a cache manager or other controller that provides an application programming interface (API) for an application. The API may be embedded in a mobile application and in a server-side application in some embodiments to insert and remove resource items to and from cache.

Figure 3:
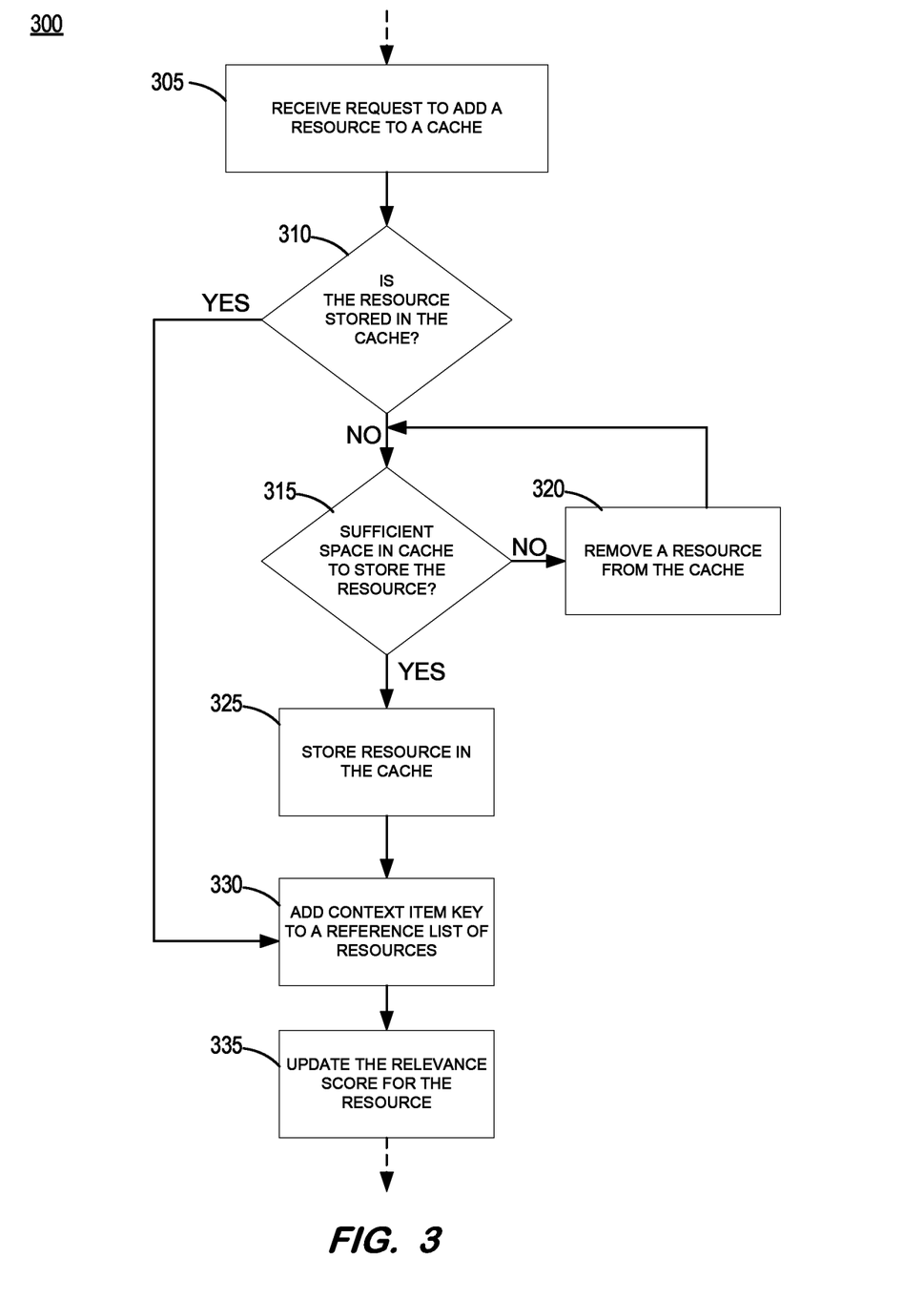
FIG. 3 is a flow diagram of a process, in accordance with some embodiments.

FIG. 3 is a flow chart of a process 300, in accordance with some embodiments herein. In some embodiments, various hardware elements of system 100 execute program instructions to perform process 300. In some embodiments, hardwired circuitry may be used in place of, or in combination with, program instructions for implementation of processes according to some embodiments. Embodiments are therefore not limited to any specific combination of hardware and software.

Prior to operation 305, an application executing on a mobile or other client device or a server-side computing device (e.g., an application server) may be developed and deployed to the device(s) to implement process 200. At operation 305, a request to add a resource to a cache of the device may be received. For example, the request may be received by a client device having a cache. Control of the cache may be managed by a cache manager or other controller. In some embodiments, management of the cache may be performed by other types and implementations of hardware and software, including a general or specialized processor. In accordance with other aspects herein, the resource in the request includes an indication of a context item key associated with the resource.

In response to receiving the request to add the resource to the cache, the cache manager or other controller may determine whether the resource is already stored in the cache at operation 310. In the instance the resource is already stored in the cache, the context item key associated with the resource in the request may be added to a resource reference list at operation 330. In some aspects, the resource reference list includes references to the resources stored in the device's cache, including the stored data items, the corresponding identifiers of the stored data items (i.e., an object key), and the context item key(s) associated with each data item stored in cache that references a context of use for the data items.

In an instance the resource is not already stored in the cache as determined at operation 310, process 300 proceeds to operation 315. At operation 315, a determination is made whether the device's cache has sufficient space to store the resource of the request. Operation 315 may include determining or checking the current size of the cache space, the size of the resource, and a maximum allowable cache size for the cache. If it is determined at operation 315 that there is sufficient space to accommodate the resource (i.e., cache size+resource size<maximum cache size), process 300 may proceed to operation 325 where the resource is stored in the cache. In the instance it is determined that there is not sufficient space to accommodate the resource, process 300 may proceed to operation 320 where a resource is removed (i.e., evicted) from the cache in an effort to free cache space for the new resource including in the request received at operation 305.

In some embodiments, operation 320 includes evicting resources from the cache based, at least in part, on the context relevance of the resources stored in the cache. In some embodiments, each resource may have a resource relevance score associated therewith. The resource relevance score may provide an indication of a total relevance value for a given resource based on all of the context item keys associated with the given resource, where each context item key has an associated relevance score. For example, referring to FIG. 2, resource 220 may have a resource relevance score of 2 and each of resources 240 and 255 may have a resource relevance score of 1, where each context item key referencing a meeting has an associated relevance score of 1.

In some embodiments, the relevance score for a context of use referenced by a context item key may be determined by an application implementing aspects of the present disclosure. For example, a first application may assign a relevance score of 1 to every meeting, notwithstanding how far in the future the meeting is scheduled to occur, the meeting's participants, the meeting's subject matter, the number of participants in the meeting, and other factors. In some embodiments, one or more of these or other factors may be used by a second application to assign a weight to the relevance score for each context item key such that, for example, a context item key may have a relevance score of 0.5, 1.0, 1.2, 1.8 or other values depending on the value the application determines for each context item key.

In some embodiments, the removing of a resource from cache at operation 320 may include removing a resource having a lowest resource relevance score from the cache before removing a resource having a higher resource relevance score. In this manner, the "least" relevant items may be removed from the cache before "more" relevant are evicted from the cache, where the relative relevance of a resource is indicated by the resource relevance score that provides an indication of a total relevance value for a given resource based on all of the context item keys associated with the given resource and each context item key has an associated relevance score Operations 315 and 320 may be repeated until it is determined at operation 315 that there is sufficient space to accommodate the resource in the cache. Process 300 may then proceed to operation 325 where the resource is stored in the cache.

At operation 330, the context item key associated with the request and the resource therein may be added to a resource reference list at operation 330. Continuing with process 300 from operation 330, operation 335 may include updating the resource relevance score for the resource referenced in the request. In some embodiments, the updating of the resource relevance score for the resource may comprise including the value of the relevance score for the context item key associated with the resource in the request in the determination or calculation of the resource relevance score for the resource.

In some aspects, process 300 may comprise part of another process(es). This aspect is indicated by the arrows leading into and out of the flow diagram of FIG. 3. In some aspects, process 300 may be used, at least in part, in combination with other cache eviction policies and mechanisms. For example, the context based cache eviction process of FIG. 3 may be implemented, at least some aspects thereof, in combination with a "least frequently used" cache eviction policy by a system, device, or service.

Figure 4:
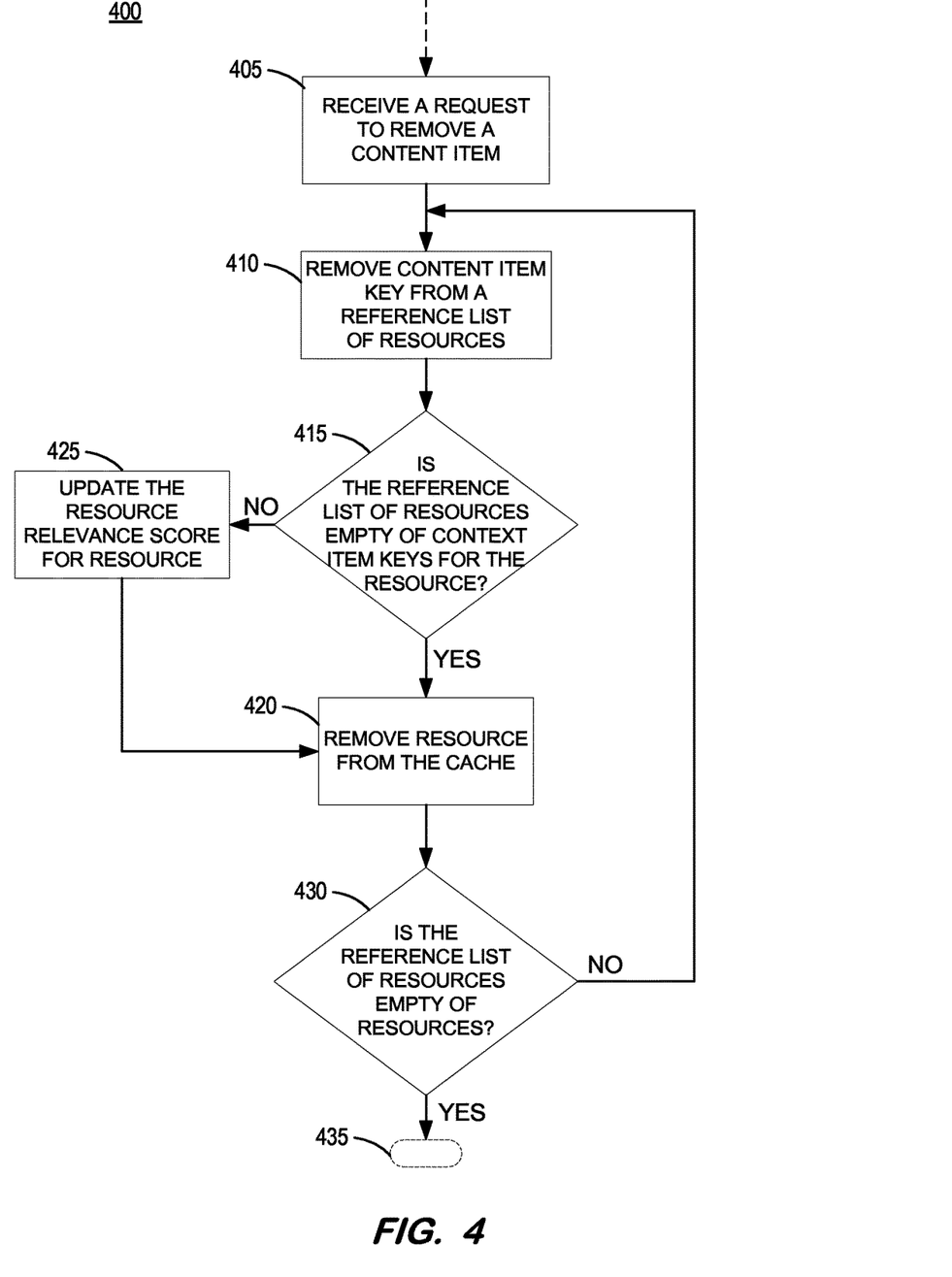
FIG. 4 is a flow diagram of a process, according to some embodiments.

FIG. 4 is a flow diagram of a process 400, in accordance with some embodiments herein. In some embodiments, various hardware elements of system 100 execute program instructions to perform process 400. In some embodiments, hard-wired circuitry may be used in place of, or in combination with, program instructions for implementation of processes according to some embodiments. Embodiments are therefore not limited to any specific combination of hardware and software.

Prior to operation 405, an application executing on a mobile or other client device or a server-side computing device (e.g., an application server) may be developed and deployed to the device(s) to implement process 400. In some embodiments, aspects of the context based caching policy disclosed herein may be embodied in a API for an application (e.g., a mobile device application or a server-side application) and may include a functionality to provide a notification of a context change. In some aspects, a request to remove a context item may be received by a device, system, or service. In some aspects, the request to remove a context item may be initiated or in response to a notification of a context change from an application. In some embodiments, the notification of the context change may be implemented as a email or other type of message.

In some aspects, the request to remove a context item may be received by a cache manager of a device or system that manages a cache associated with the system or device, in accordance with the present disclosure.

The request to remove the context item may include or reference a context item key. It is noted that the context item keys herein may be unique identifiers of a context of use referenced by the context item key.

For each resource stored in a cache and referencing the context item key identified with the request of operation 405, process 400 may perform operations 410-430. Referring to FIG. 2 as an example, it is noted that a request to remove the context item related to a meeting (e.g., "mtg_001") corresponding to context item 230 may include two resources. Resources 220 and 255 are both associated with the context of use of context item key 230 (i.e., mtg_001). Accordingly, operations 410-430 may be traversed regarding both resource 220 and resource 255.

At operation 410, the context item key corresponding to the request of operation 405 may be removed from a resource reference list (e.g., FIG. 2, resource reference list 200) managed by a cache controller or other processor. The cache manager may operate to remove the association between the context item key and the particular resource being operated on in operation 410.

At operation 415, a determination is made whether the reference list of references is empty of context item keys associations for the resource. For example, referring to FIG. 2 it is noted that after removal of context item key 230, resource 220 will still have another context item key associated therewith. However, resource 255 will not have any other context item keys associated with it after the removal of context item key 230 from the reference list of resources 200.

In an instance it is determined that the reference list of references is empty of (other) context item key associations for the resource, process 400 proceeds to operation 420. At operation 420, the resource with no (other) context item key associations may be removed (i.e., evicted) from the cache. A resource without any context item key associations may be an indication that the resource is no longer relevant, at least to the application, device, system, or service implementing the context based cache eviction policy herein.

In an instance it is determined that the reference list of references is includes other context item key associations for the resource, process 400 proceeds from operation 415 to operation 425. At operation 425, the resource relevance score for the resource with other context item key associations may be updated. This resource (e.g., resource 220 of FIG. 2 with remaining context item key association 235) may have its resource relevance score updated to account for the removal of context item key 230 from the reference list of resources 200.

Process 400 may proceed from operations 420 and 425 to operation 430. At operation 430, a decision may be made to determine whether the reference list of resources is empty of resources. If the reference list of resources is empty of resources, the process may proceed to 435 that may be a termination point or other processes. If the reference list of resources is not empty of resources, process 400 may proceed to a point before operation 410 so that operations 410-430 may be performed for each remaining resource in the reference list of resources.

In some aspects, process 400 may comprise part of another process(es). This aspect is indicated by the arrows leading into the flow diagram of FIG. 4 and the optional termination point 435. In some aspects, process 400 may be used, at least in part, in combination with other cache eviction policies and mechanisms.

Figure 5:
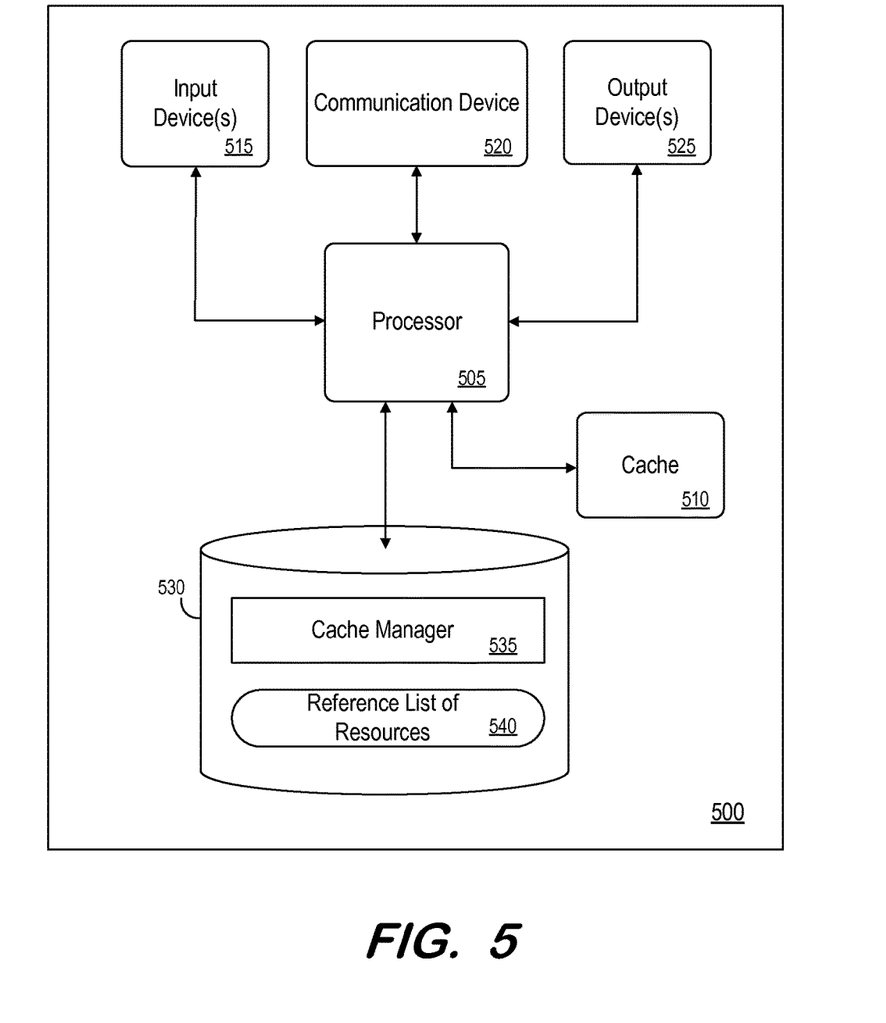
FIG. 5 is a block diagram of a computing device, in accordance with some embodiments.

FIG. 5 is a block diagram overview of a system or apparatus 500 according to some embodiments. System 500 may be, for example, associated with any of the devices described herein, including for example an application server (e.g., FIG. 1, 105) and a client device (FIG. 1, 125), in accordance with processes disclosed herein. System 500 comprises a processor 505, such as one or more commercially available Central Processing Units (CPUs) in the form of one-chip microprocessors or a multi-core processor, coupled to a communication device 520 configured to communicate via a communication network (not shown in FIG. 5) to another device or system (e.g., an agent device and one or more sensor sets). In the instance system 500 comprises a server or a client device (e.g., supporting context based cache eviction functions and services provided by a cache controller), communication device 520 may provide a mechanism for system 500 to interface with another device, system, or service (e.g., another server, controller, and client device). System 500 may also include a cache 510, such as RAM memory modules. The system further includes an input device 515 (e.g., a touchscreen, mouse and/or keyboard to enter content) and an output device 525 (e.g., a touchscreen, a computer monitor to display, a LCD display).

Processor 505 communicates with a storage device 530. Storage device 530 may comprise any appropriate information storage device, including combinations of magnetic storage devices (e.g., a hard disk drive), optical storage devices, solid state drives, and/or semiconductor memory devices. In some embodiments, storage device 530 may comprise a database system, including in some configurations an in-memory database.

Storage device 530 may store program code or instructions 535 that may provide computer executable instructions for managing a cache by a cache controller, in accordance with processes herein. Processor 505 may perform the instructions of the program instructions 535 to thereby operate in accordance with any of the embodiments described herein. Program instructions 535 may be stored in a compressed, uncompiled and/or encrypted format. Program instructions 535 may furthermore include other program elements, such as an operating system, a database management system, and/or device drivers used by the processor 505 to interface with, for example, peripheral devices (not shown in FIG. 5). Storage device 530 may also include data 540 such as a reference list of resources. Data 540 may be used by system 500, in some aspects, in performing one or more of the processes herein, including individual processes, individual operations of those processes, and combinations of the individual processes and the individual process operations.

All systems and processes discussed herein may be embodied in program code stored on one or more computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Examples of a use-case herein have primarily focused on an implementation of the context based cache eviction policy and framework by a communication application concerned with meeting schedules. It is noted that this is just one example and the cache policy disclosed herein may be implemented by other types of applications, including but not limited to a email application that determines a relevancy of email resources (e.g., email messages) assigns a context item key to the email resources indicative of a relative relevancy of the particular email resources. For example, the application may determine the weight or relevancy value for an email message by examining and considering the age of the email message, the subject matter of the email message, the number of recipients of the email message (e.g., more recipients may indicate a less relevant message as opposed to a message addressed to a few or a single recipient), a group of recipients for the email message, a importance/priority associated with the email message, and other factors that may be considered alone or in combination with each other. Some other types of applications that may incorporate aspects of the present disclosure include social network applications, business database management related systems and services (e.g., enterprise resource planning, human resource planning, product lifecycle management, etc.)

In some embodiments, a framework for providing the context based cache eviction policy disclosed herein may be embedded in an application. A developer of the application may define which data items (i.e., resources) will be placed in a cache and the context item (e.g., context item keys) that will reference or otherwise relate to the data items to be stored in the cache. In some aspects, the application developer or other responsible entity may define the "relevance" of a particular context of use.

In some embodiments, aspects herein may be implemented by an application, device, or system to manage cache in a consistent manner across different devices, effectively across an entire domain.

Although embodiments have been described with respect to web browser displays, note that embodiments may be associated with other types of user interface displays. For example, a user interface may be associated with a portable device such as a smart phone or a tablet computing device ("tablet"), with a user interface element.

The embodiments described herein are solely for the purpose of illustration. Those in the art will recognize other embodiments which may be practiced with modifications and alterations.

What is claimed is:

1. A method implemented by a computing system in response to execution of program instructions by a processor of the computing system, the method comprising:
   receiving a request to add a resource to a cache, the resource including a data object and a context item key associated with the resource, wherein the context item key uniquely identifies a context of use email message or meeting the resource associated with the context item key participates in and wherein the context of use email message or meeting for the resource to participate in is uniquely identified by its associated context item key;
   determining whether the resource is stored in the cache;
   storing, in response to the determination that the resource is not stored in the cache, the resource in the cache; and
   adding the context item key of the resource stored in the cache to a record of a reference list of resources.

2. The method according to claim 1, further comprising:
   determining an expiration time for participation by the resource in the context of use referenced by the context item key; and
   removing the context item key after the expiration time.

3. The method of claim 2, further comprising:
   evicting the resource including the data object from the cache when no context item keys associated with the resource remain.

4. The method according to claim 1, further comprising:
   determining whether there is sufficient free space in the cache to store the resource; and
   removing, in response to the determination that there is not sufficient space in the cache to store the resource, at least one other resource from the cache until there is sufficient space in the cache to store the resource.

5. The method of claim 4, wherein determining whether there is sufficient free space in the cache to store the reference further comprises:
   determining a current size of the cache space, a size of the resource and a maximum allowable cache size for the cache.

6. The method of claim 4, wherein the removing comprises removing a resource having a lowest resource relevance score from the cache before removing a resource having a higher resource relevance score, the resource relevance score providing an indication of a total relevance value for a given resource based on all of the context item keys associated with the given resource, where each context item key has an associated relevance score.

7. The method of claim 1, wherein the resource further comprises a relevance score associated with the context of use referenced by the resource's context item key.

8. The method according to claim 7, further comprising:
   assigning a weight to the relevance score for the context item key received in the request.

9. The method of claim 7, further comprising updating a resource relevance score for the resource to include the relevance score for the context item key received in the request, the resource relevance score providing an indication of a total relevance value for a given resource based on all of the context item keys associated with the given resource, where each context item key has an associated relevance score.

10. The method of claim 1, wherein the record of the reference list of resources is managed by at least one of a mobile device application and a server-side application.

11. The method of claim 1, wherein the request to add the resource to a cache is received from an application.

12. A non-transitory medium storing processor-executable program instructions, the medium comprising program instructions executable by a computer to:
    receive a request to delete a context item key from a record of a reference list of resources associated with at least one resource that is stored in a cache and referenced in the reference list of resources, the resource including a data object, wherein the context item key uniquely identifies a context of use email message or meeting the resource referenced by the context item key participates in and wherein the context of use email message or meeting for the resource to participate in is uniquely identified by its referencing context item key;
    deleting the context item key included in the request from the reference list of resources;
    determining, for each resource referenced in the reference list of resources, whether at least one other context item key is present in the reference list of resources for the respective resource;
    removing, in response to the determination for each resource referenced in the reference list of resources that there is not at least one other context item key present in the reference list of resources, the respective resource from the cache; and
    saving the record of the reference list of resources.

13. The medium of claim 12, further comprising updating, in response to the determination for each resource referenced in the reference list of resources that there is at least one other context item key present in the reference list of resources, a resource relevance score for the respective resources stored in the cache, the updated resource relevance score providing an indication of a total relevance value for a given resource based on all of the context item keys currently associated with the given resource, where each context item key has an associated relevance score.

14. The medium of claim 12, wherein the record of the reference list of resources is managed by at least one of a mobile device application and a server-side application.

15. The medium of claim 12, wherein the request to remove the context item key is received from an application.

16. A system comprising:
    a computing device comprising:
        a memory storing processor-executable program instructions; and
        a processor to execute the processor-executable program instructions to cause the computing device to:
            receive a request to add a resource to a cache, the resource including a data object and a context item key associated with the resource, wherein the context item key uniquely identifies a context of use email message or meeting the resource associated with the context item key participates in and wherein the context of use email message or meeting for the resource to participate in is uniquely identified by its associated context item key;
            determine whether the resource is stored in the cache;
            store, in response to the determination that the resource is not stored in the cache, the resource in the cache;
            add the context item key of the resource stored in the cache to a record of a reference list of resources.

17. The system according to claim 16, further comprising the processor to execute the processor-executable program instructions to cause the computing device to:

determine whether there is sufficient space in the cache to store the resource; and remove, in response to the determination that there is not sufficient space in the cache to store the resource, at least one other resource from the cache until there is sufficient free space in the cache to store the resource.

18. The system of claim 16, wherein the removing comprises removing a resource having a lowest resource relevance score from the cache before removing a resource having a higher resource relevance score, the resource relevance score providing an indication of a total relevance value for a given resource based on all of the context item keys associated with the given resource, where each context item key has an associated relevance score.

19. The system of claim 16, wherein the resource further comprises a relevance score for the context item key referenced by the resource's context item key.

20. The system of claim 19, further comprising the processor to execute the processor-executable program instructions to cause the computing device to update a resource relevance score for the resource to include the relevance score for the context item key received in the request, the resource relevance score providing an indication of a total relevance value for a given resource based on all of the context item keys associated with the given resource, where each context item has an associated relevance score.

21. The system of claim 16, wherein the record of the reference list of resources is managed by at least one of a mobile device application and a server-side application.

22. The system of claim 16, wherein the request to add the resource to a cache is received from an application.

* * * * *